United States Patent
Brault et al.

[11] 3,981,012
[45] Sept. 14, 1976

[54] RANDOM FREQUENCY RADAR SYSTEMS

[75] Inventors: Yves Brault; Paul Josse, both of Paris, France

[73] Assignee: Compagnie Generale de Telegraphie, Paris, France

[22] Filed: June 29, 1961

[21] Appl. No.: 125,906

[30] Foreign Application Priority Data
July 8, 1960  France ............................ 60.832389

[52] U.S. Cl. ....................... 343/17.1 R; 343/17.2 R
[51] Int. Cl.² ............................................ G01S 7/28
[58] Field of Search ............ 325/18; 343/17.1, 17.2, 343/5, 14, 17.5, 17.1 R, 17.2 R

[56] References Cited
UNITED STATES PATENTS
3,050,726  8/1962  Laurent ............................ 343/17.1

Primary Examiner—Maynard R. Wilbur
Assistant Examiner—Richard E. Berger
Attorney, Agent, or Firm—Haseltine, Lake & Waters

EXEMPLARY CLAIM

1. A random frequency radar system comprising: a normally blocked transmitting channel including a radio frequency oscillator; a receiving channel including a mixer and a local oscillator feeding said mixer; means for selecting a random pair of associated frequencies $F_p$ and $F_l$ differing by a fixed value; means for tuning said radio frequency oscillator and said local oscillator respectively on said selected frequencies $F_p$ and $F_l$; a normally blocked auxiliary channel connected in parallel with said receiving channel at a point thereof beyond said mixer, said auxiliary channel having an output and including a threshold device for translating to said output only signals above a predetermined level; first means for temporarily unblocking said auxiliary channel, and second means connected to said auxiliary channel output for blocking and unblocking the normal operation of said radar system at said selected pair of associated frequencies and a timing circuit for successively making operative said selecting means, said first means, and said second means.

5 Claims, 4 Drawing Figures

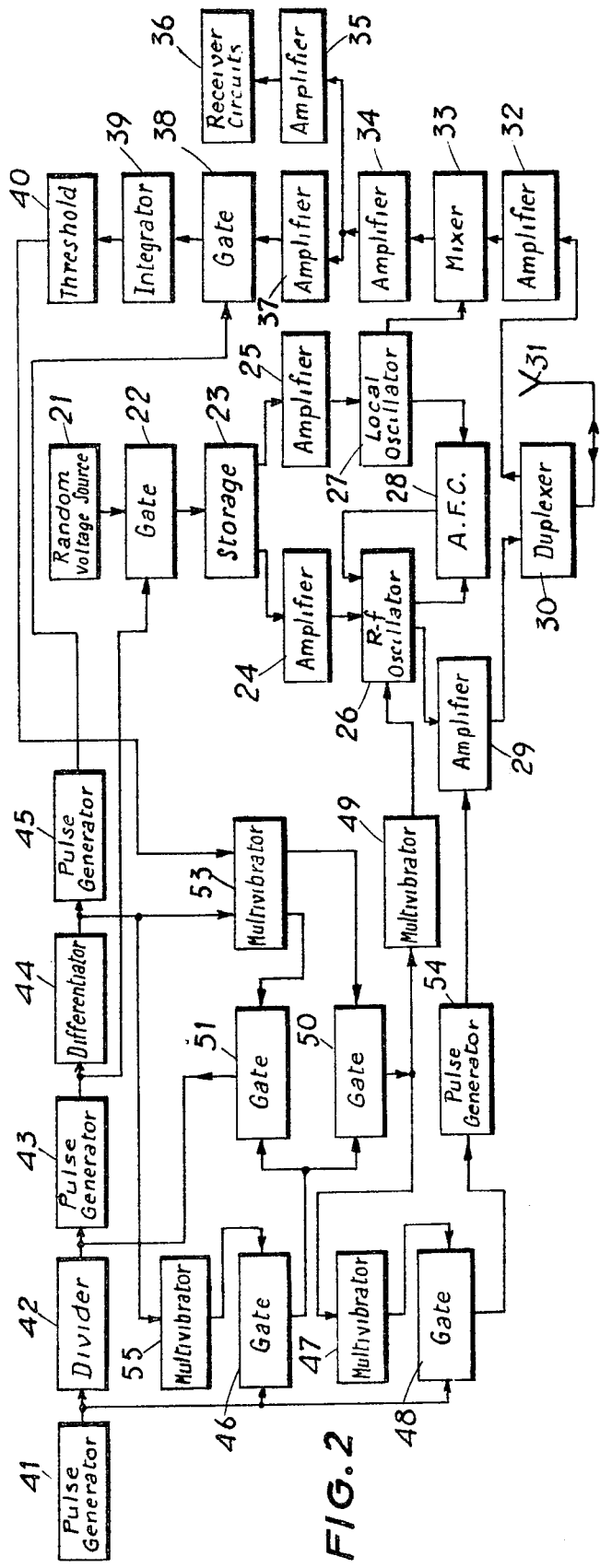
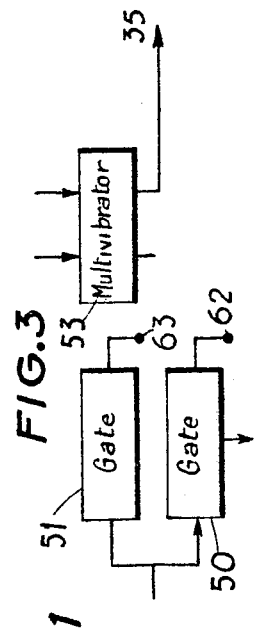
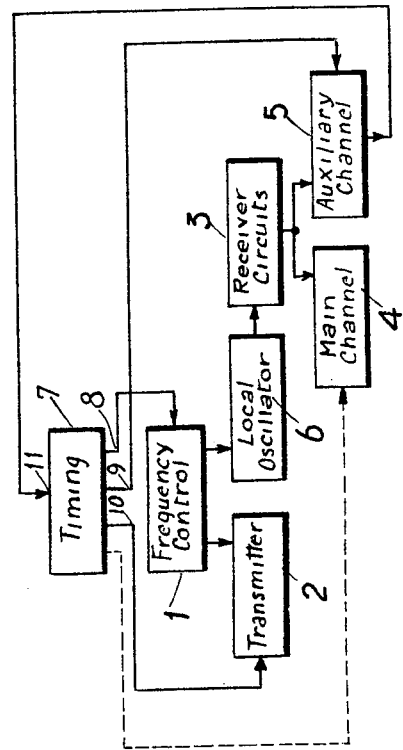

RANDOM FREQUENCY RADAR SYSTEMS

The present invention relates to random frequency radar systems comprising a transmitter including a radio frequency oscillator for transmitting pulses at said radio frequency and a receiver including a local oscillator said radio frequency oscillator and said local oscillator being respectively tuned to oscillate at frequencies $F_p$ and $F_l$, which are of a random nature but differ by a constant amount from each other, the local oscillator oscillating at frequency $F_l$, as long as echo signals at the frequency $F_p$ are received.

According to the present invention, the radar system is operated to provide echo signals at a frequency $F_p$ only after the level of the noise or interference signals has been checked during a time interval during which the local oscillator oscillates at the frequency $F_l$ which is associated with frequency $F_p$. If during this time interval the detected signal, either instantaneous or integrated, has a level higher than a predetermined threshold, the normal operation of the radar system at the transmitting frequency $F_p$ is prevented.

The invention will be best understood from the following description and appended drawings, wherein:

FIG. 1 is a simplified block diagram of a radar according to the invention;

FIG. 2 is a block diagram illustrating, in more detail, an embodiment of the invention;

FIG. 3 is a block-diagram of an alternative embodiment of the connections of certain elements of FIG. 2.

Figure 4:
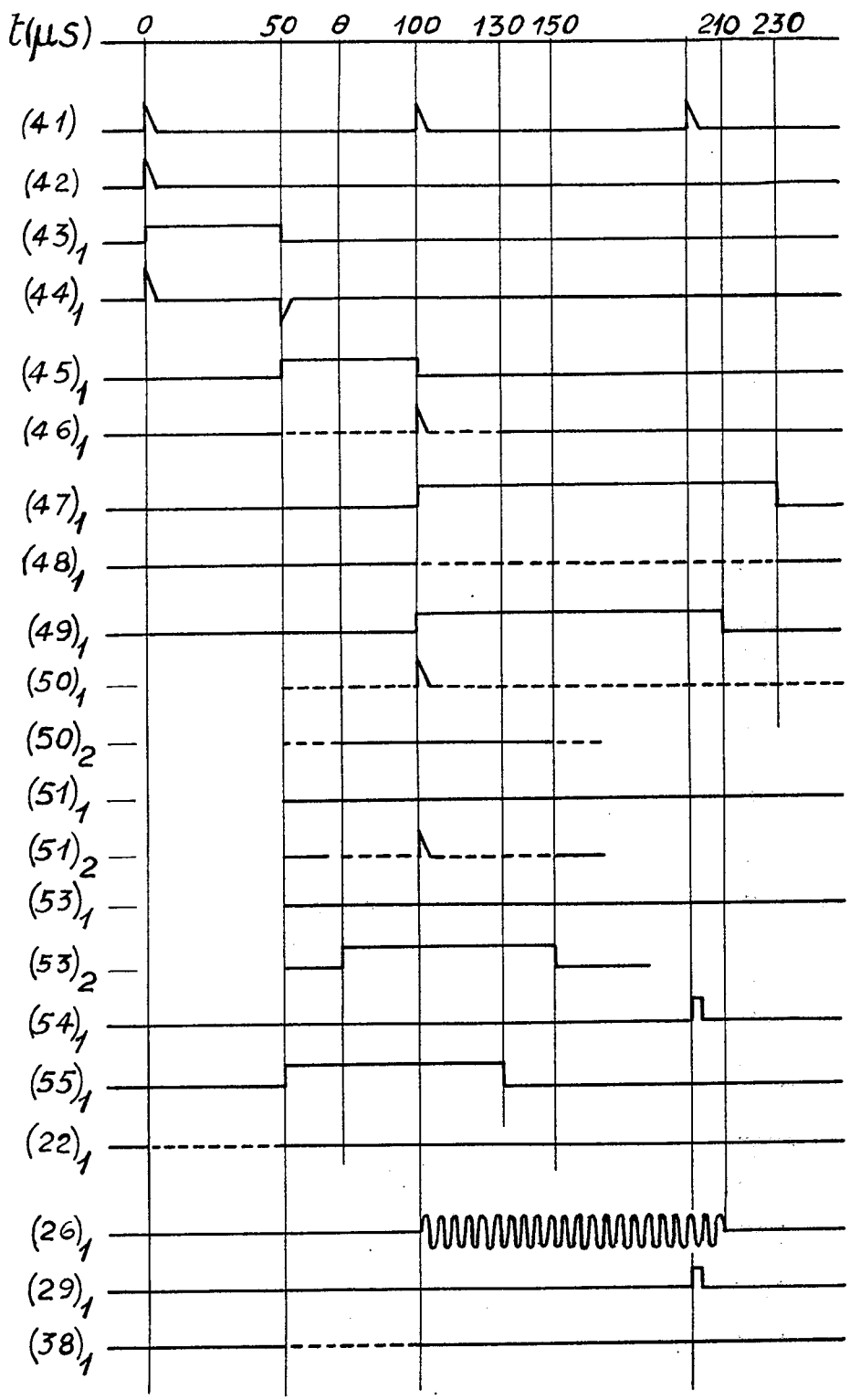
FIG. 4 is a diagram which illustrates the operation of the embodiment of the invention shown in FIG. 2.

Referring more particularly to FIG. 1 of the drawings, there is shown a random frequency radar system according to the invention. Channel 1 delivers the signals determining the associated instantaneous random frequencies at which the radar radio-frequency oscillator, included in the transmission channel 2, and the local oscillator 6 respectively oscillate. This channel, which, for the sake of brevity, will be designated herein as the "random frequency control system", may be of any suitable type adapted to cause the local oscillator to oscillate at a frequency $F_l$ which differs, by a given fixed value, from the frequency $F_p$ of the radio frequency oscillator during the radar cycle during which echoes at frequency $F_p$ are received. In particular, a radar system of the type described in the co-pending U.S. patent application, Ser. No. 785,524, filed by the Applicants for "IMPROVEMENTS IN VARIABLE FREQUENCY RADAR SYSTEMS", may be used.

In FIG. 1, it has been assumed that the random frequency control system 1 delivers two signals respectively applied to the local oscillator 6 and to the transmission channel 2. However, the invention is not limited to this specific operation mode of circuit 1.

The receiver comprises a common portion 3, to which are connected in parallel a main channel 4 and an auxiliary or noise level-checking channel 5. The common receiver portion 3 comprises at least the high frequency stages and the mixer which is fed by the local oscillator 6. The receiver portion 3 and the main channel 4 build up a conventional random frequency radar receiver. The auxiliary channel 5 comprises a threshold device, so as to deliver an output signal only if the signals applied to its input, this signal being considered at any given instant or integrated for a certain interval of time, exceed a predetermined level. A synchronizing or timing circuit 7 has its outputs 8, 9 and 10 respectively connected to the random frequency control device 1, the auxiliary channel 5 and the transmission channel 2. Its input 11 is connected to the output of the auxiliary channel 5.

The operation of the system illustrated in FIG. 1 is composed of a succession of various steps and is controlled by circuit 7.

In a first step the random frequency control device 1 provides to the local oscillator 6 and the radio-frequency oscillator of channel 2 respective signals which adjust their respective frequencies to values $F_l$ and $F_p$. The local oscillator starts oscillating at frequency $F_l$. The radio frequency master oscillator may either start oscillating at frequency $F_p$, in which case the transmitter is disabled in any manner, or is blocked, so that, in any case, the transmitter is prevented from operating.

Thus the auxiliary channel 5 collects only parasitic or jamming signals. According to whether the level of these signals is above or below the threshold level of the threshold device included in channel 5, the latter provides or not a control signal to system 7. This step of operation constitues the second or "parasite level checking" step.

In the first case, system 7 initiates a new random frequency selecting cycle of device 1, the respective random frequencies of the local and radio frequency oscillators being thus modified.

In the second case, system 7 initiates the transmission by unblocking transmitter 2.

In one preferred embodiment, the radio frequency oscillator and the radio frequency amplifier of transmitter 2 are both blocked during the random frequency selecting step and the parasite level checking step, the transmission step comprising two sub-steps, namely (a) the unblocking of the radio frequency oscillator which starts oscillating at frequency $F_p$ and (b) the unblocking for a short duration of the radio frequency amplifier resulting in transmission of a radar pulse signal. An automatic frequency control device (not illustrated in the drawing) may be provided between the local oscillator and the pilot oscillator for improving their operation.

The transmission step is followed in the usual manner by the reception stage, at the end of which the synchronizing device 7 initiates a new random frequency selecting cycle.

According to an alternative operation mode of the system shown in FIG. 1, the transmission step is initiated whatever the result of the parasite level checking step. But, if the result of the checking is unfavorable, the signal applied by the auxiliary channel to circuit 7 will cause the latter to block the main receiver 4, through a connection shown in dotted line in FIG. 1, during the transmission step and the normal reception step. This alternative method results, however, in a greater loss of information than the above described one.

Of course, the arrangement described may undergo numerous modifications, which are obvious to those skilled in the art, in particular in so far as devices 1 and 7 are concerned.

Also, the auxiliary channel may be coupled to the receiver channel at various points thereof, provided this point is located beyond the mixer, and may have various structures provided it comprises a threshold device.

By way of example, a detailed arrangement of one embodiment of the invention will be described with reference to FIG. 2, as applied to a random frequency radar system of the type disclosed in the above mentioned co-pending Patent Application which delivers random voltages comprised within predetermined limits. System 21 is coupled to a storage device 23 through a normally closed frequency selector gate 22. The storage device 23 is arranged for storing, during the time interval separating two operations of gate 22, a voltage which has been collected at the terminals of a capacitor.

The output of the storage device 23 is coupled through two respective amplifiers 24 and 25 to the radio-frequency oscillator 26 and the local oscillator 27, which are preferably wide-band electrically tunable oscillators, for example, those known under the registered trade mark "CARCINOTRON". One of the amplifiers comprises means, such as for example an auxiliary source, for adding to its input voltage a fixed additional voltage, such that the output voltages of the two amplifiers 24 and 25, differing also by a given constant value correspond to frequencies differing by a number of cycles substantially equal to the value of the intermediate frequency. A conventional automatic frequency control 28 keeps the difference between the frequencies of those two oscillators more precisely equal to the intermediate frequency. The circuit so far described is disclosed in the above mentioned co-pending Patent Application and need not be set forth here in more detail. However, in the circuit of FIG. 2, it is the radio frequency oscillator 26 which is controlled by the local oscillator 27. Also it is the input voltage of amplifier 24, which feeds the radio-frequency oscillator, which is transposed.

The circuit of FIG. 2 also comprises a radio-frequency transmission amplifier 29, a duplexer 30, an aerial 31, a radio-frequency receiver amplifier 32, a mixer 33, which is fed by amplifier 32 and the local oscillator 27, an intermediate-frequency, wide-band amplifier 34 and a further narrow-band amplifier 35, the remainder of the receiver being designated by block 36.

An embodiment of that circuit portion of FIG. 2 which is provided by the invention will now be described, it being understood that the numerical values stated are given only by way of example.

The auxiliary chain 5 of FIG. 1 comprises in FIG. 2 an intermediate frequency amplifier 37 which is coupled, in parallel with amplifier 35, to the output of the wide-band amplifier 34, amplifier 37 being also a wide-band amplifier, while amplifier 35 is a narrow-band amplifier. The output of amplifier 37 is connected to the input of a normally closed gate 38. The output of gate 38 is coupled, through an integrating device 39, to a threshold detector 40.

The synchronization circuit 7 of FIG. 1 will now be described. It comprises in FIG. 2 a pulse generator 41 which provides 1 $\mu$s pulses with a repetition period of 100 $\mu$s. The output of generator 41 is connected to:
a pulse-repetition frequency divider 42, which delivers pulses with a repetition period pf 2700 $\mu$s;
one of the inputs of a normally closed gate 46, and one of the inputs of a normally closed gate 48.

Divider 42 is followed in series by a gating pulse generator 43, delivering gating pulses of 50 $\mu$s for each input pulse; a differentiator circuit 44, providing, for each gating pulse received, two short pulses $a$ and $b$ of opposite polarities respectively corresponding to the beginning and the end of the gating pulse; a further gating pulse generator 45, delivering a gating pulse of 50 $\mu$s for each pulse $b$ received, pulses $a$ not affecting the gating pulse generator 45 on account of their polarity.

A monostable multivibrator 55, the duration of the unstable state of which is 80 $\mu$s, has its input coupled to the differentiator circuit 44 and its output to the control input of gate 46.

The output of gate 46 is connected in parallel to two respective inputs of gates 50 and 51.

The output of gate 51 is connected to the input of the gating pulse generator 43.

The output of gate 50 is coupled in parallel to two respective inputs of two monostable multivibrators 47 and 49. The output of multivibrator 47, the duration of the unstable state of which is 130 $\mu$s, is coupled to the control input of gate 48. The duration of the unstable state of multivibrator 49 is 110 $\mu$s.

The output of gate 48 is connected to a square pulse generator 54, providing a pulse of 2 $\mu$s for each input pulse.

Finally, a bistable multivibrator 53 has its two outputs connected to the respective control inputs of gates 50 and 51, and one of its two inputs connected to the output of the differentiator circuit 44.

The connections between the synchronization circuit 7 and the other radar circuits are as follows: the output of gating pulse generator 43 is coupled to the control input of gate or frequency selector 22; the output of gating pulse generator 45 is coupled to the control input of gate 38, inserted in the auxiliary channel 5; the second input of the bistable multivibrator 53 is coupled to the output of the threshold detector 40; the output of the monostable multivibrator 49 is connected for unblocking the radio-frequency oscillator; the output of the square pulse generator 54 is coupled for unblocking the radio-frequency transmission amplifier 29.

The operation of this system will now be described with reference to the diagram of FIG. 4 which shows the sequence of the pulses at the various significant points in the system, the states of the radio frequency oscillator and amplifier, and of the various gates, the reference numerals between brackets designating the corresponding elements of FIG. 2:

It will be assumed that, immediately before the instant $t = 0$, the condition of the circuit is as follows, the open gates being represented by dashed lines and the closed gates by continuous lines:

The frequency selector 22 is closed. The storage device 23 has stored the voltage corresponding to the associated frequencies $F_{l-1}$ and $F_{p-1}$ which are the value of $F_l$ and $F_p$ at the instant $t_{-1}$ immediately preceding the instant $t = 0$. The local oscillator 27 oscillates at frequency $F_l$ (K−1) and the reception channel 4 still operates to provide the echo signals at the frequency $F_{p-1}$. The radio-frequency oscillator 26 is blocked. The radio-frequency transmission amplifier 29 is blocked. Gate 38 of the auxiliary channel 5 is closed. Integrating device 39 is discharged. Bistable multivibrator 53 may be in one of its stable stages "0" or "1". If it is in state 0, gate 50 is open and gate 51 closed, consequently, the states of these three devices, from time $t = 0$ to time $t = 50$ $\mu$ s are not shown in FIG. 4. If in state 1, the reverse takes place. The monostable multivibrators 55 and 47 are both in their stable state, resulting in the closure of gates 46 and 48.

It will be assumed that, at the instant $t = 0$, a pulse appears at the output of generator 41 and that this pulse causes the occurrence of a pulse at the output of divider 42, which occurs for every $27^{th}$ pulse provided by generator 41. The output pulse of generator 41 is also applied to the inputs of gates 46 and 48, but, these later being closed, it cannot pass therethrough.

The output pulse of divider 42, which is applied to gating pulse generator 43, causes the same to provide a gating pulse which opens the frequency selector gate 22. The voltage across the terminals of the capacitor belonging to the storage device 23 is thus modified, and so is the output voltages of amplifiers 24 and 25, causing the frequency of the local oscillator 27 to vary, as described in the above mentioned co-pending patent application.

The gating pulse produced by generator 43, which is also applied to the differentiating circuit 44, causes the latter to deliver a pulse $a$, which, due to its polarity, does not affect the circuits to which it is applied.

At instant $t = 50$ μs, corresponding to the end of the gating pulse produced by generator 43, gate 22 closes. The output voltage of the storage device 23, as well as the output voltages of the amplifiers 24 and 25 do not vary any longer and the local oscillator 27 oscillates at a frequency $F_{lo}$ which is the value of random frequency $F_l$ at the instant $t = 0$.

Pulse $b$, delivered by the differentiating circuit 44, which corresponds to the end of the gating pulse produced by generator 43, and which is applied to the monostable multivibrator 55, switches the same to its unstable state for a time interval of 80 μs, thus causing gate 46 to be opened. Pulse $b$ which is also applied to the bistable multivibrator 53, resets the same into its 0 state, if it was not already in this state, gate 51 being now positively closed and gate 50 positively open. Pulse $b$, which is also applied to the gating pulse generator 45, causes the same to open gate 38, thus unblocking the auxiliary chain 5 for an interval of time of 50 μs, at the end of which the closing of gate 38 ensures the discharging of integrator 39 if it has been charged.

The auxiliary channel is thus operating. Since the radio-frequency oscillator 26 is still blocked, this channel will receive only interference, jamming or parasitic signals, the level of which is thus ascertained, indicating whether the random frequency selected is suitable for making the operation of the radar system immune against these signals.

The parasitic voltage signals at the output of amplifier 37 pass through gate 38 and are applied to integrator 39, the output of which is connected to the threshold detector 40.

Two cases are then possible:

First case — At the instant $t = 100$ μs the integrated voltage is lower than the threshold of detector 40. In FIG. 1, the subscripts 1 refer to this first case.

In this case, the bistable multivibrator 53 has remained in its 0 state and the pulse produced at the instant $t = 100$ μs by generator 41 finds gate 48 closed but gate 46 open and, after passing through gate 46, which is maintained open from $t = 50$ μs to $t = 130$ μs by the action of the monostable multivibrator 55, will find gate 50 open and gate 51 closed. It will pass through 50 and trip the monostable multivibrator 49 into its unstable state for a time interval of 110 μs, thus unblocking for this period of time the radio-frequency oscillator 26 which starts oscillating at frequency $F_{po}$, which is the value of random frequency $F_p$ at the instant $t = 0$.

The pulse delivered by gate 50 also trips the monostable multivibrator 47 which opens gate 48 from $t = 100$ μs to $t = 230$ μs.

The pulse transmitted at the instant $t = 200$ μs by generator 41 does not pass through gate 46 which has been closed at instant $t = 130$ μs but passes through gate 48, since gate 48 is open, and sets into operation generator 54, which produces a short square pulse which unblocks amplifier 29 during the corresponding interval of time, thus causing the transmission of a radar pulse. At the instant $t = 210$ μs, the radio-frequency oscillator 26 is again blocked.

The pulses subsequently transmitted by generator 41 will find gates 46 and 48 closed, and, up to the instant $t = 2700$ μs, can no longer cause a pulse to appear at the output of divider 42. The pulse at the instant $t = 2700$ μs will initiate again the process which started at the instant $t = 0$.

Second case — At an instant $\theta$, comprised between $t = 50$ μs and $t = 100$ μs, the value of the integrated voltage has reached a level higher than the threshold of detector 40. In FIG. 4, the subscripts 2 refer to this second case. Of course, from time $t = 0$ to time $t = \theta$ there is no difference between lines in FIG. 4 corresponding to same points in FIG. 2; also lines 43, 44, 45, 46, 47, 48, 49, 54, 55 and 22, 26, 29, 38 are only represented in the first case since from time $t = 0$ to time $t = 100$ they would be the same in both cases, and that, in the second case, they would start again at time $t = 100$ as at $t = 0$ in both cases also lines 41 and 42 are the same for both cases.

This voltage is detected by detector 40 and trips the bistable multivibrator 53 into its 1 state, gate 50 being thus closed and gate 51 opened. The pulse transmitted at the instant $t = 100$ μs by generator 41 passes through gates 46 and 51 to reach the gating pulse generator 43.

The process described hereinabove starts again at the instant $t = 100$ μs, in the same way as at the instant $t = 0$, with a loss of just 100 μs.

According to an alternative embodiment, illustrated in FIG. 3, gate 51 is maintained constantly closed and gate 50 constantly open, by coupling their respective control inputs to the points 63 and 62 at fixed potential.

A single output of the multivibrator 53 is used. According to whether the bistable multivibrator 53 is in its 0 state or in 1 state, it will block or unblock the radar receiver, for example, at amplifier 35, the other output of multivibrator 53 remaining unconnected. In this case, the transmission always takes place at the instant $t = (200 + 2700$ N$)$ μs, N being an integer. If noise, higher than the threshold defined by detector 40, has been detected, the radar receiver channel is blocked and stays blocked until multivibrator 53 is again tripped into its 0 state, which takes place at the instants $t = (50 + 2700$ N$)$ μs.

The fixed potentials of these arrangements may be either the ground potential or that of a continuous voltage source whose other terminal is grounded.

It should be noted that the receiver displaying system is controlled in synchronism with the transmission of the radar pulses, in a conventional manner.

Accordingly, the corresponding connections have been neither described nor shown.

Of course, the invention is not limited to the embodiment described and shown, which has been given merely by way of example.

What is claimed, is:

1. A random frequency radar system comprising: a normally blocked transmitting channel including a radio frequency oscillator; a receiving channel including a mixer and a local oscillator feeding said mixer; means for selecting a random pair of associated frequencies $F_p$ and $F_l$ differing by a fixed value; means for tuning said radio frequency oscillator and said local oscillator respectively on said selected frequencies $F_p$ and $F_l$; a normally blocked auxiliary channel connected in parallel with said receiving channel at a point thereof beyond said mixer, said auxiliary channel having an output and including a threshold device for translating to said output only signals above a predetermined level; first means for temporarily unblocking said auxiliary channel, and second means connected to said auxiliary channel output for blocking and unblocking the normal operation of said radar system at said selected pair of associated frequencies and a timing circuit for successively making operative said selecting means, said first means, and said second means.

2. A random frequency radar system comprising a normally blocked transmitting channel including a radio frequency oscillator; a receiving channel including a mixer and a local oscillator feeding said mixer; means for selecting a random pair of associated frequencies $F_p$ and $F_l$ differing by a fixed value; means for tuning said radio frequency oscillator and said local oscillator respectively on said selected frequencies $F_p$ and $F_l$; a normally blocked auxiliary channel connected in parallel with said receiving channel at a point thereof beyond said mixer, said auxiliary channel having an output and including a threshold device for translating to said output only signals above a predetermined level; a first normally inactive circuit for making operative said selecting means for selecting a pair of associated frequencies; a second normally inactive circuit, coupled to the output of said auxiliary channel, for making operative said selecting means; a third normally inactive circuit for temporarily unblocking said auxiliary channel; a fourth normally inactive circuit coupled to the output of said auxiliary channel, for controlling said transmitting channel for bringing about the transmission of a radar pulse at frequency $F_p$ of said selected pair of associated frequencies; and timing means for successively making operative said first circuit, said third circuit, and one of said second and said fourth circuits according to whether a signal is present or not at the output of said auxiliary channel.

3. A random frequency radar system comprising: a normally blocked transmitting channel including a radio frequency oscillator; a receiving channel including a mixer and a local oscillator feeding said mixer; means for selecting a random pair of associated frequencies $F_p$ and $F_l$ differing by a fixed value; means for tuning said radio frequency oscillator and said local oscillator respectively on said selected frequencies $F_p$ and $F_l$; a normally blocked auxiliary channel connected in parallel to said receiving channel at a point thereof beyond said mixer, said auxiliary channel having an output and including a threshold device for translating to said output only signals above a predetermined level; first means for temporarily unblocking said auxiliary channel, second means for controlling the transmission of a radar pulse at frequency $F_p$ of said pair of associated frequencies, and third means connected to said auxiliary channel output for blocking and unblocking said receiving channel and a timing circuit for successively making operative : said selecting means, said first means, said second means and said third means.

4. A random frequency radar system comprising : a normally blocked transmitting channel including a radio frequency oscillator; a receiving channel including a mixer and a local oscillator feeding said mixer; means for selecting a random pair of associated frequencies $F_p$ and $F_l$ differing by a fixed value; means for tuning said radio frequency oscillator and said local oscillator respectively on said selected frequencies $F_p$ and $F_l$; a normally blocked auxiliary channel connected in parallel to said receiving channel at a point thereof beyond said mixer, said auxiliary channel having an output and including an integrator for integrating the input signals of said auxiliary channel and a threshold device for translating to said output of said auxiliary channel only the output signals, of said integrator, above a predetermined level first means for unblocking said auxiliary channel for a fixed time interval, and second means connected to said auxiliary channel output for blocking and unblocking the normal operation of said radar system at said pair of associated frequencies and a timing circuit for successively making operative said selecting means, said first means, said second means and said third means.

5. A random frequency radar system comprising : a normally blocked transmitting channel including a radio frequency oscillator; a receiving channel including a mixer and a local oscillator feeding said mixer; means for selecting a random frequency $F_l$, means for tuning said local oscillator on said frequency $F_l$; means for tuning said radio frequency oscillator on a frequency $F_p$ differing from said frequency $F_l$ by a fixed value; a normally blocked auxiliary channel connected in parallel with said receiving channel at a point thereof beyond said mixer, said auxiliary channel having an output and including an integrator for integrating the input signals of said auxiliary channel and a threshold device for translating to said output of said auxiliary channel only the output signals, of said integrator, above a predetermined level and having an output; and a timing circuit comprising a timing pulse generator having an output, means for unblocking said selecting means and selecting a frequency $F_l$, said unblocking means having an input, said timing pulse generator output and said unblocking means input being connected by a parallel circuit comprising a first and a second branch, said first branch including a pulse repetition frequency divider and said second branch including gating means, means for unblocking said auxiliary channel for a fixed time interval after the tuning of said local oscillator on a selected frequency $F_l$, means for controlling said transmitting channel for bringing about, after said fixed time interval has elapsed the transmission of a radar pulse at frequency $F_p$ associated with said selected frequency $F_l$; and means connected to said auxiliary channel output for unblocking said means for controlling said transmitting channel if no signal has been detected at said auxiliary channel output before the end of said fixed time interval and for unblocking said second branch through said gating means if a signal has been detected at the output of said auxiliary channel before the end of said fixed time interval.

* * * * *